(12) United States Patent
Yu et al.

(10) Patent No.: US 8,648,518 B2
(45) Date of Patent: Feb. 11, 2014

(54) COMPRESSOR WITH SNUG PERFORATED STATOR END-COVER

(75) Inventors: Wen-Ho Yu, Taoyuan Hsien (TW);
Fu-Rong Chen, Taoyuan Hsien (TW);
Hung-Ming Liao, Taoyuan Hsien (TW);
Chih-Chung Chen, Taoyuan Hsien (TW)

(73) Assignee: Rechi Precision Co., Ltd., Taoyuan Hsien (TW)

( * ) Notice: Subject to any disclaimer, the term of this patent is extended or adjusted under 35 U.S.C. 154(b) by 238 days.

(21) Appl. No.: 13/253,184

(22) Filed: Oct. 5, 2011

(65) Prior Publication Data

US 2013/0089443 A1    Apr. 11, 2013

(51) Int. Cl.
*H02K 5/00* (2006.01)

(52) U.S. Cl.
USPC ............. 310/417; 310/216.114; 310/216.119; 310/400; 310/402

(58) Field of Classification Search
USPC .............. 310/410, 411, 413, 415, 254.1, 260, 310/216.114, 216.115, 417
See application file for complete search history.

(56) References Cited

U.S. PATENT DOCUMENTS

| | | | | | |
|---|---|---|---|---|---|
| 2,039,456 | A | * | 5/1936 | Sammarone | 310/166 |
| 2,411,684 | A | * | 11/1946 | Hamilton et al. | 310/410 |
| 2,523,520 | A | * | 9/1950 | Reinhard | 310/402 |
| 3,378,711 | A | * | 4/1968 | Swanke | 310/260 |
| 3,518,467 | A | * | 6/1970 | Wightman | 310/63 |
| 3,527,970 | A | * | 9/1970 | Wightman et al. | 310/63 |
| 3,768,152 | A | * | 10/1973 | Swanke et al. | 29/596 |
| 3,829,720 | A | * | 8/1974 | Swanke et al. | 310/43 |
| 3,844,031 | A | * | 10/1974 | Stone et al. | 29/596 |
| 3,866,314 | A | * | 2/1975 | Stone et al. | 29/598 |
| 3,882,336 | A | * | 5/1975 | Boyd et al. | 310/216.115 |
| 3,916,232 | A | * | 10/1975 | Barone | 310/63 |
| 4,186,319 | A | * | 1/1980 | Dochterman | 310/89 |
| 4,250,417 | A | * | 2/1981 | Arnold | 310/62 |
| 4,490,638 | A | * | 12/1984 | Lind | 310/269 |
| 4,603,273 | A | * | 7/1986 | McDonald | 310/89 |
| 4,882,832 | A | * | 11/1989 | Lewis | 29/596 |
| 4,893,041 | A | * | 1/1990 | Snider et al. | 310/215 |
| 5,306,976 | A | * | 4/1994 | Beckman | 310/215 |
| 5,430,338 | A | * | 7/1995 | McMillan et al. | 310/89 |
| 5,929,545 | A | * | 7/1999 | Fargo | 310/89 |
| 6,133,668 | A | * | 10/2000 | Huang et al. | 310/216.119 |
| 6,407,474 | B1 | * | 6/2002 | Mahn et al. | 310/89 |
| 6,495,936 | B2 | * | 12/2002 | Kikuchi et al. | 310/58 |
| 6,933,640 | B2 | * | 8/2005 | Schurter et al. | 310/85 |
| 7,541,701 | B2 | * | 6/2009 | Lin et al. | 310/58 |
| 8,113,797 | B2 | * | 2/2012 | Valbjoern et al. | 417/363 |
| 8,288,905 | B2 | * | 10/2012 | Qin et al. | 310/89 |
| 2002/0130573 | A1 | * | 9/2002 | Kikuchi et al. | 310/91 |
| 2005/0082921 | A1 | * | 4/2005 | Schurter et al. | 310/58 |
| 2005/0194844 | A1 | * | 9/2005 | Becherucci et al. | 310/42 |
| 2007/0114862 | A1 | * | 5/2007 | Cha et al. | 310/89 |
| 2007/0278876 | A1 | * | 12/2007 | Haga et al. | 310/71 |

* cited by examiner

*Primary Examiner* — Burton Mullins
*Assistant Examiner* — Mark R Carter
(74) *Attorney, Agent, or Firm* — Jackson IPG PLLC (57) ABSTRACT

A power driven component inside a compressor is disposed with a stator and rotors. The stator has an iron core in a circular ring and stator coils in a tightly wound manner. A vertical interval is formed between adjacent stator coils. A cover body is formed on the stator and a shield member that is formed with an upper portion along each stator coil and bending curve portions at two sides of the upper portion. Each bending curve portion is extended toward the interval from the upper portion. A sealed cover portion is connected between the bending curve portions of the upper portion and correspondingly seals each interval to reduce noise of the compressor and oil circulation rate.

6 Claims, 8 Drawing Sheets

COMPRESSOR WITH SNUG PERFORATED STATOR END-COVER

BACKGROUND OF THE INVENTION

1. Field of the Invention

The present invention relates to a compressor, and more particularly to a compressor capable of reducing noise and oil circle rate.

2. Description of the Related Art

In the past, a coolant circulation device is connected to a rotary compressor (compressor), a gas cooling device, a condensation mechanism (expansion valve) and an evaporator in order so as to form a circular pipe, thereby forming a coolant circulation (coolant loop). Coolant gas is sucked into a low pressure chamber side from a suck inlet of a rotary compression component of a rotary compressor. After performing the compression through motions of a roller and vanes, coolant gas having high temperature and high pressure is formed. Next, the coolant gas is exhausted to the gas cooling device via the exhaust holes and from the high pressure chamber side. After the coolant gas is released with heat at the gas cooling device, the coolant gas is condensed by the condensation mechanism and then is supplied to the evaporator. The coolant is evaporated at the evaporator and absorbs heat at the periphery under this condition to bring cooling effect into full play.

Figure 1:
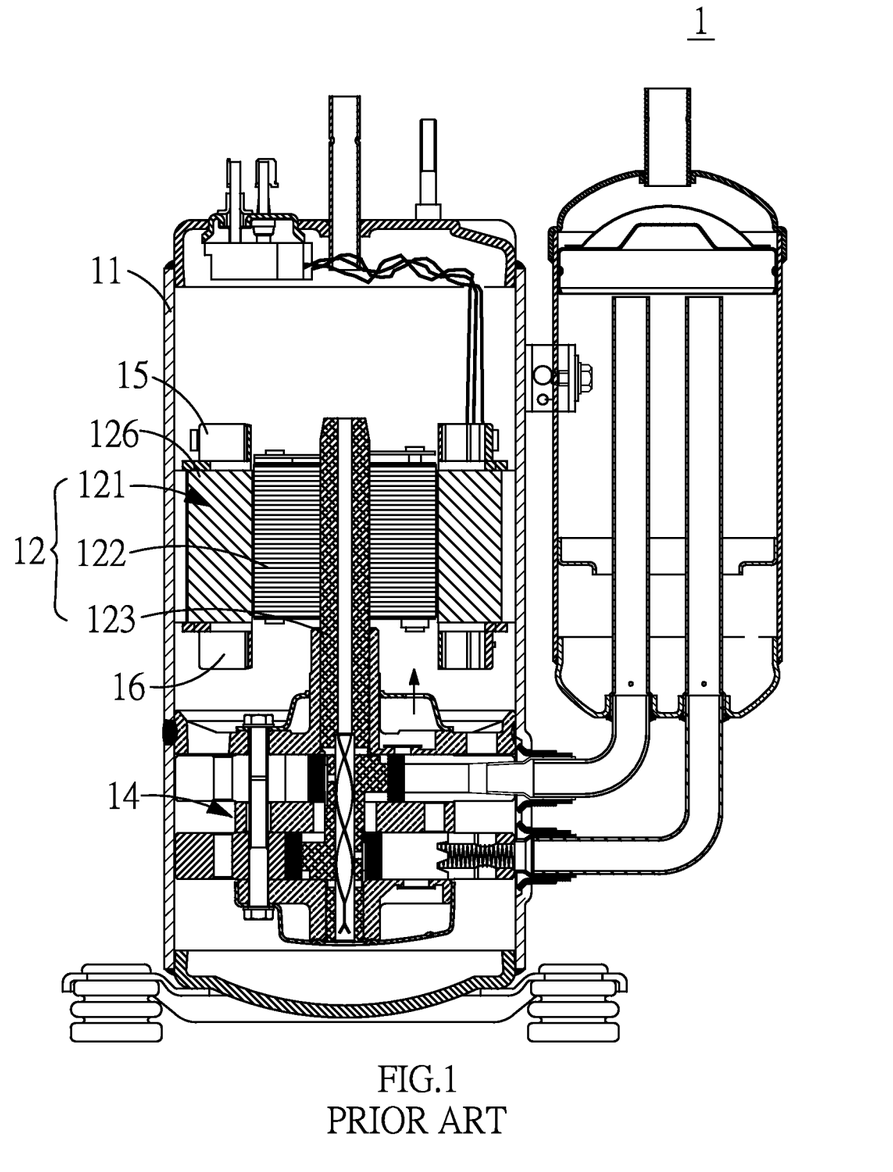
FIG. 1 is a schematic diagram of a structure of a common compressor.
Figure 2:
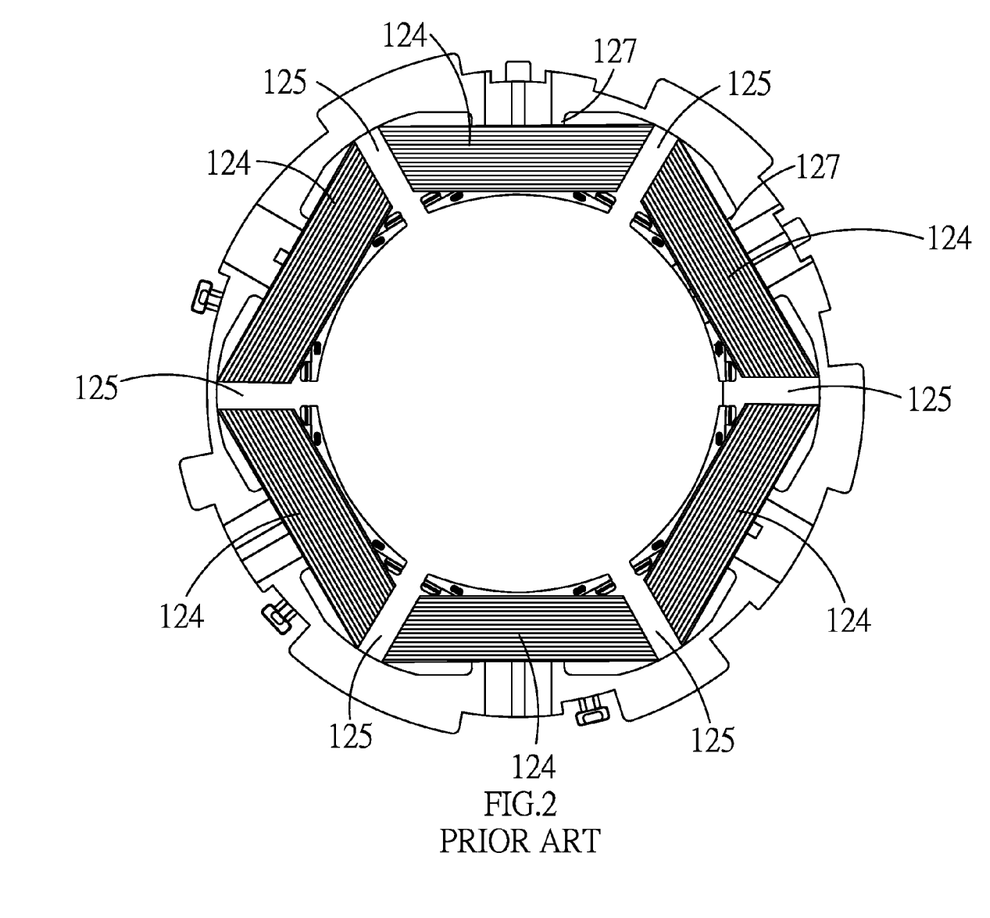
FIG. 2 is a schematic diagram of a stator structure of a conventional compressor.

A common compressor 10 as shown in FIG. 1 and FIG. 2 includes a power driven component 12, which is taken as a driving component, inside a sealed container 11 and a rotary compression component 14 driven by a rotary shaft 123 of the power driven component 12. The power driven component 12 is composed of a stator 121 installed in a circular ring along an inner face of an upper space of the sealed container 11, and rotors 122 inserted into intervals of inner side of the stator 121. A rotary shaft 123 that is extended toward a vertical direction is fastened on each of the rotors 122.

The stator 121 has a laminated body of electromagnetic steel plates stacked in a circular ring and stator coils 124 installed in a tightly wound manner. Intervals 125 vertically passing through are formed between adjacent stator coils 124. The coolant gas flows through the intervals 125 between adjacent stator coils 124 to generate sound chamber resonance. Consequently, noise generated by the operation is increased.

SUMMARY OF THE INVENTION

In view of the shortcomings of the prior art, the inventor(s) of the present invention based on years of experience in the related industry t and extensive research and experiments, have finally developed a compressor whose principle objective is to reduce noise and oil circulation rate.

To achieve the foregoing objective of the invention, a power driven component inside a compressor according to the invention is disposed with a stator and rotors. The stator has an iron core in a circular ring and a plurality of stator coils in concentrated winding manner. An interval vertically passing through is formed between adjacent stator coils. A cover body is formed on the stator and a shield member that is formed with an upper portion along each stator coil and bending curve portions at two sides of the upper portion. The upper portion is relatively located on the stator coils. The upper portion is disposed with at least one through hole. Each bending curve portion is extended toward the interval from the upper portion. A sealed cover portion is connected between the bending curve portions of the upper portion and correspondingly seals each interval to reduce noise of the compressor and oil circle rate.

DETAILED DESCRIPTION OF THE PREFERRED EMBODIMENTS

The foregoing and other technical characteristics of the present invention will become apparent with the detailed description of the preferred embodiments and the illustration of the related drawings.

The invention improves a stator of a common compressor. As shown in FIG. 1, the compressor also has a sealed container 11. A power driven component 12 is disposed inside the sealed container 11. The power driven component 12 is disposed with the stator 121 installed in a circular state along the inner surface of the sealed container 11 and rotors 122 inserted into the inner side of the stator 121. A rotary shaft 123 that is extended toward a vertical direction is fastened to each rotor 122. A rotary compression component 14 driven by the rotary shaft 123 of the power driven component 12 is disposed below the inside of the sealed container 11.

Figure 3:
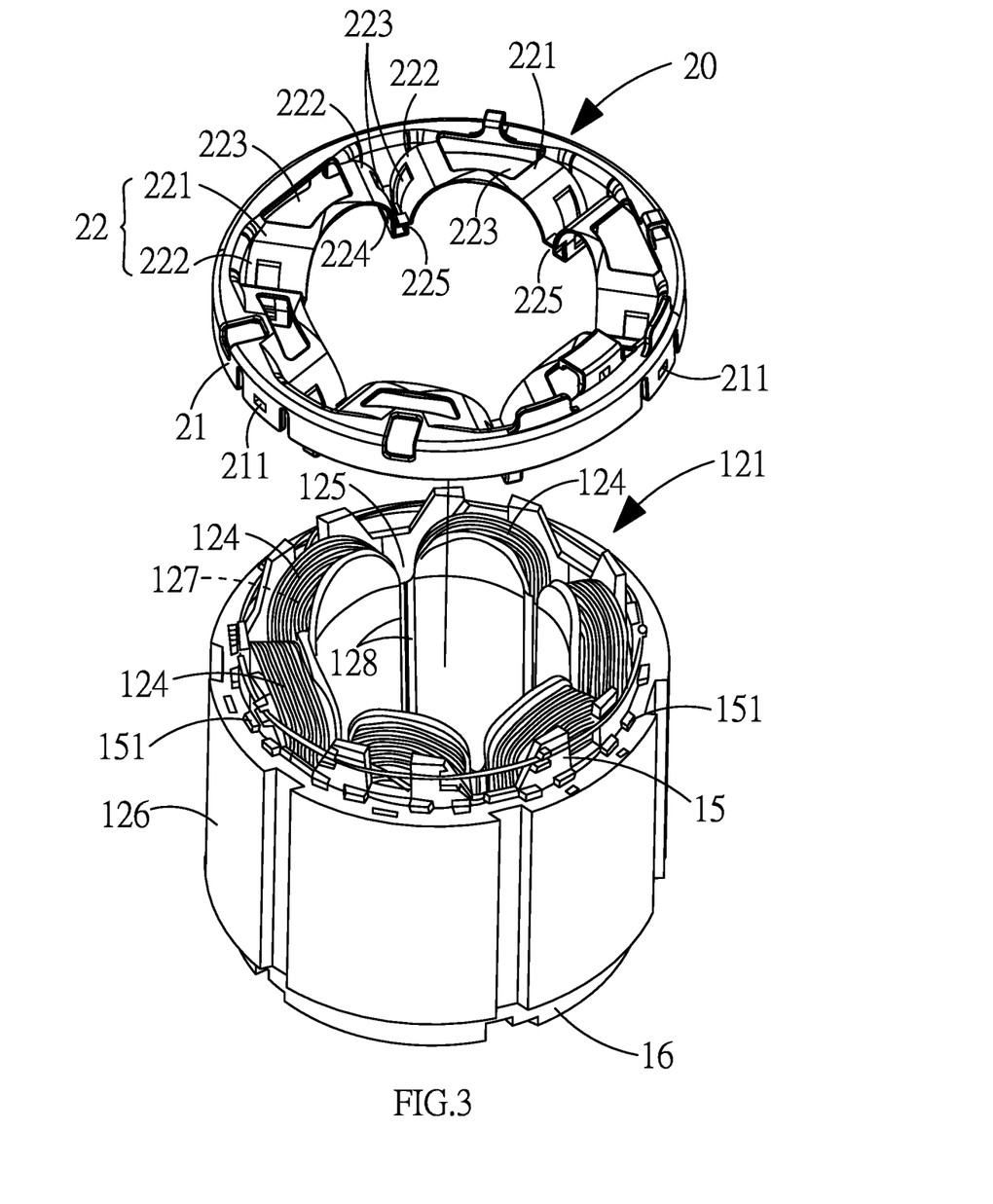
FIG. 3 is a structural decomposition drawing of a stator and a cover body according to the invention.
Figure 4:
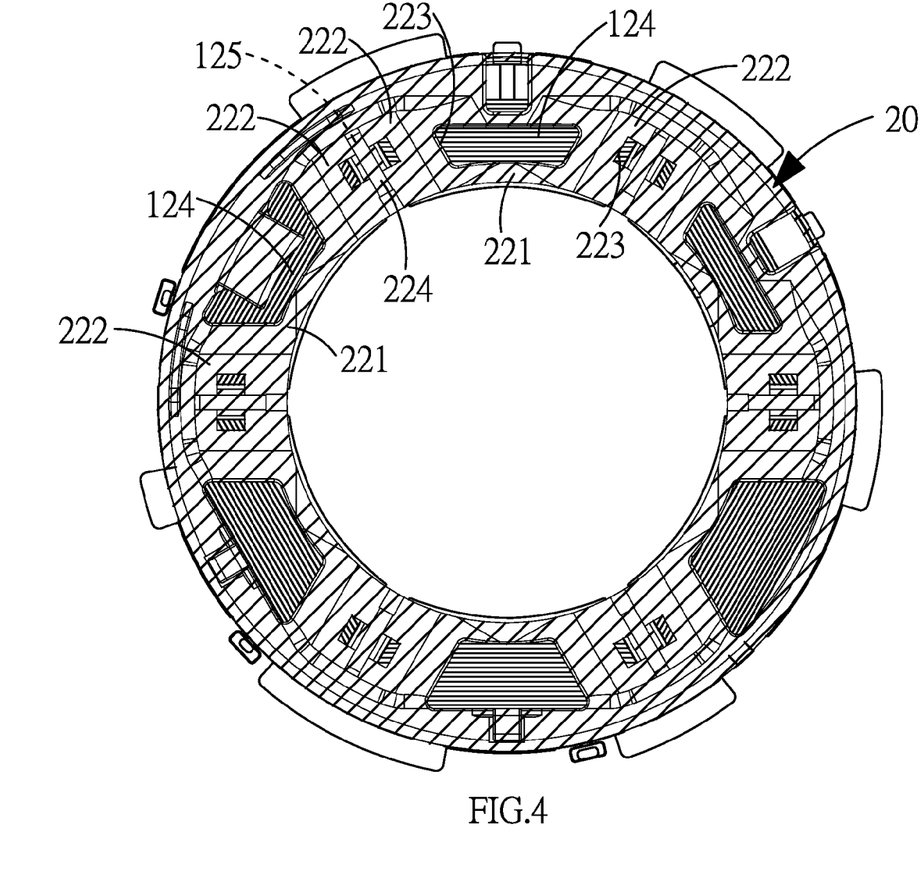
FIG. 4 is a structural schematic diagram of a stator and a cover body according to the invention.
Figure 5:
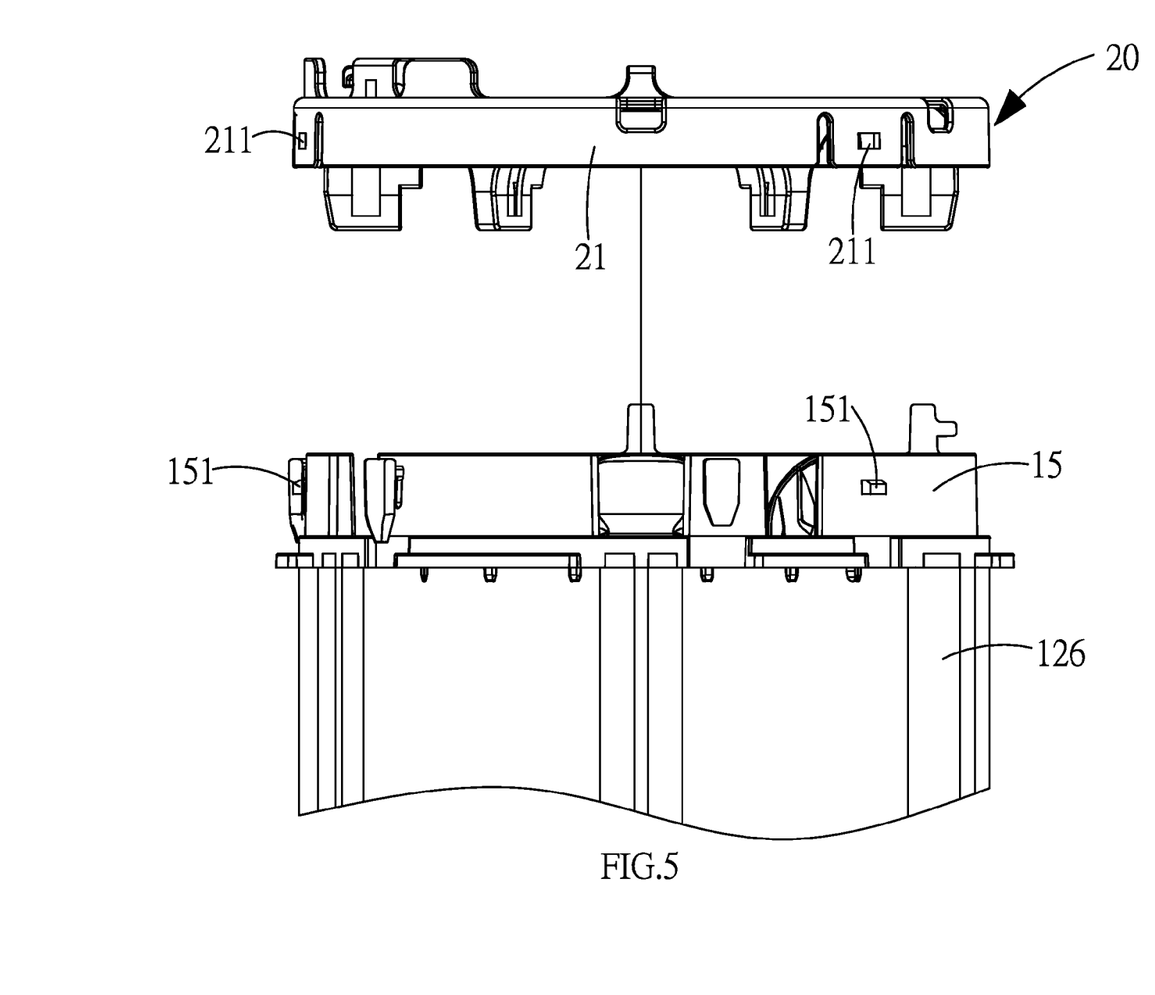
FIG. 5 is a decomposition drawing of a stator and a cover body according to the invention.

As shown in FIG. 3 to FIG. 5, the stator 121 has an iron core 126 having a circular ring and a plurality of stator coils 124. The stator coils 124 are installed to a plurality of tooth portions 127 at an inner circumference of the iron core 126 in winding manner. The inside of the stator 121 is formed with intervals 125 vertically passing through and that is between adjacent stator coils 124. Upper and lower portions of the iron core 126 are respectively disposed with an upper frame 15 and a lower frame 16.

Figure 6:
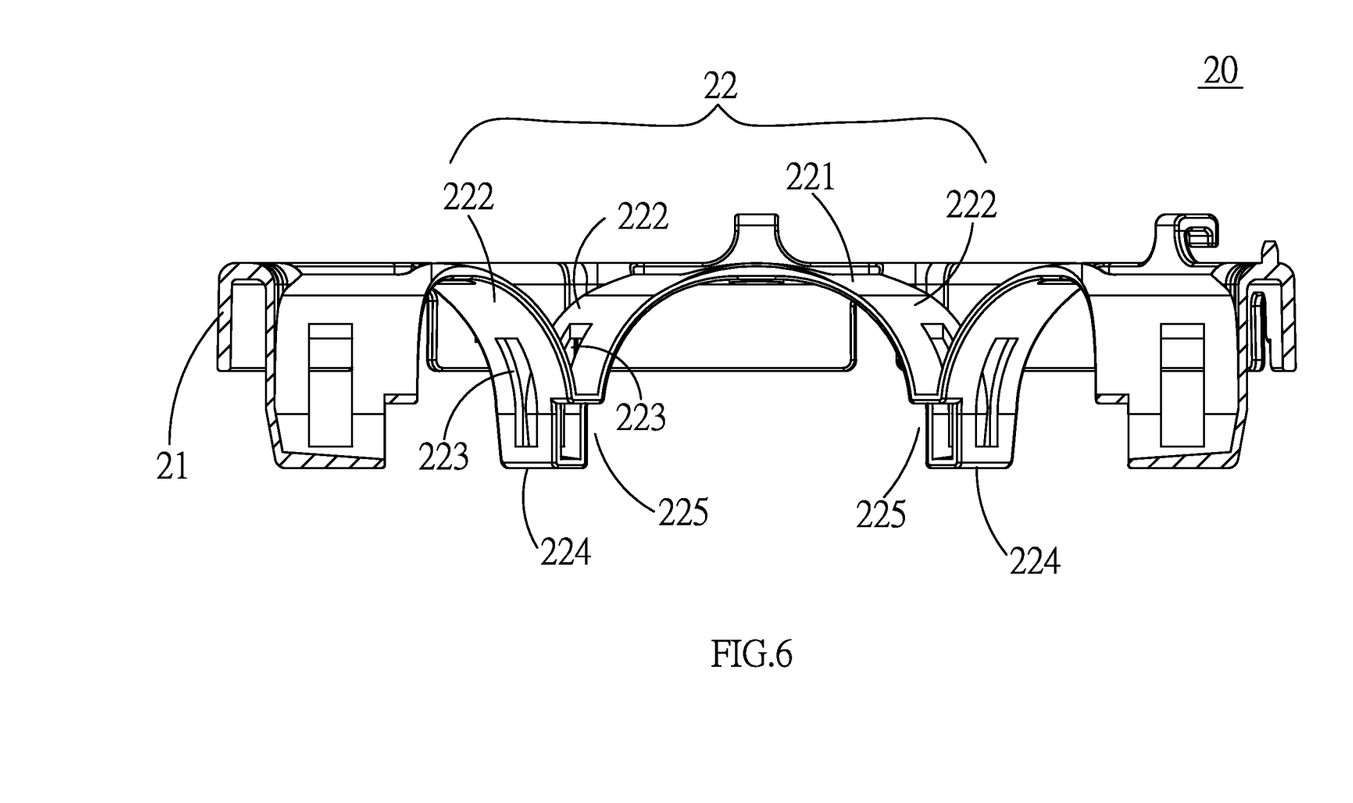
FIG. 6 is a schematic diagram of a structure of the cover body according to the invention.

An upper portion of the stator 121 is disposed with a cover body 20. With reference to FIG. 6, a cover body 20 is disposed with a ring edge 21 capable of being fastened to the stator 121. The ring edge 21 is formed with a shield member 22 that is toward the stator coils 124. The shield member 22 is formed with an upper portion 221 and bending curve portions 222 at two sides of the upper portion 221 along each stator coil 124. The upper portion 221 is disposed with at least one through hole 223. Each bending curve portion 222 is extended toward the interval 125 from the upper portion 221, and a sealed cover portion 224 is connected between the bending curve portions 222 of each upper portion 221.

While in assembly, as shown in the embodiment, the ring edge 21 is disposed with at least one fastening hole 211. The side of the upper frame 15 is formed with fastening blocks 151 corresponding to each other. Since the fastening holes 211 are mutually lodged with the fastening blocks 151, the cover body 20 can be fastened on the stator 121, and the upper portion 221 of the shield member is relatively located on the stator coils 124. The sealed cover 224 correspondingly seals each interval 125. Of course, at least one fixing block can also be disposed to the ring edge. The side of the upper frame is formed with the fastening holes corresponding to each other so as to achieve the same fastening effect.

Since the sealed cover portion 224 of the cover body seals each interval 125, the coolant gas can be prevented from flowing through the interval to reduce the chance of sound chamber resonance, thereby decreasing noise generated by the operation of the compressor and oil circulation rate. The through hole 223 on the upper portion can allow the coolant gas to flow back to a rotary compression component via the through hole 223 to obtain better heat dissipation. Moreover, at least one through hole 223 is disposed on the bending curve portion 222 to retain better heat dissipation effect as well.

Figure 7:
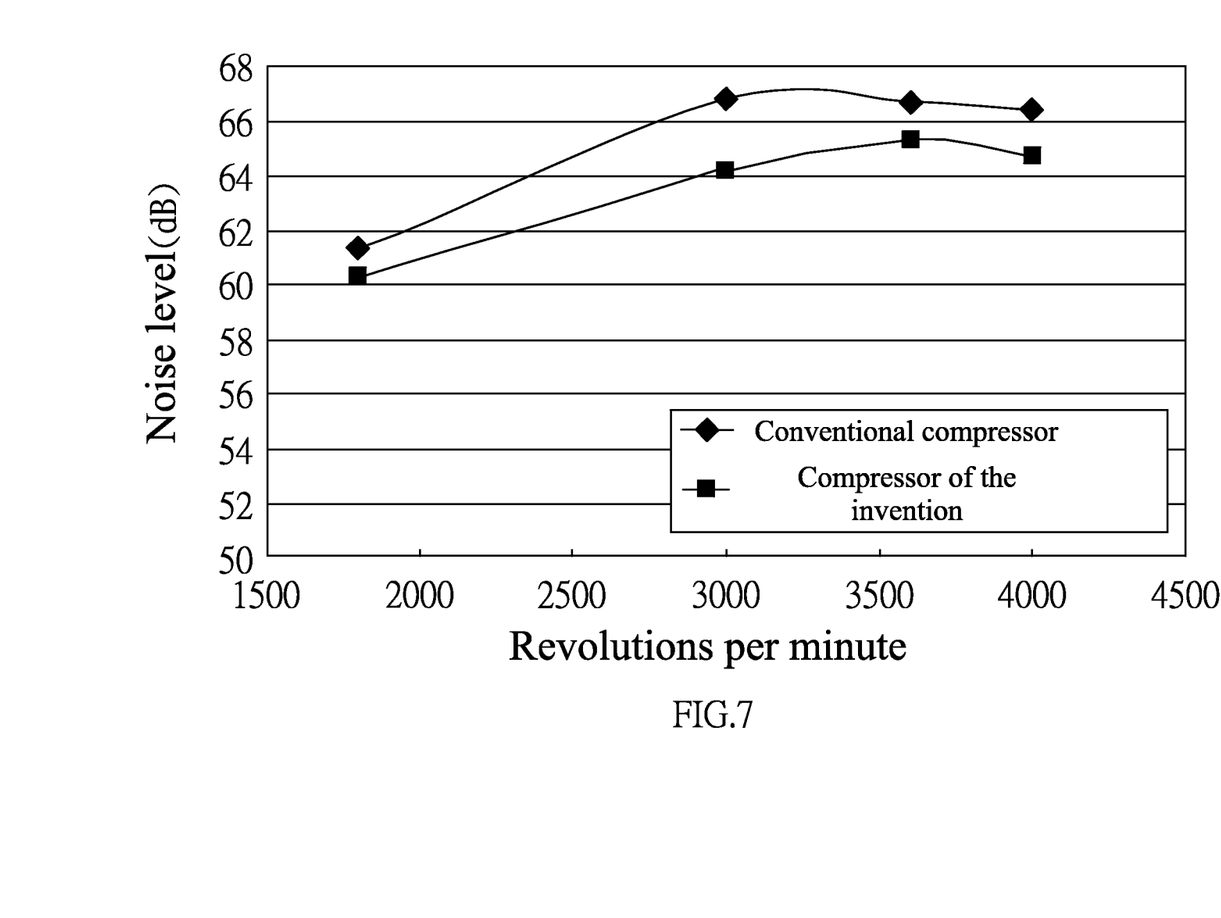
FIG. 7 is an illustration diagram of noise generated from the compressor of the invention and conventional compressors.
Figure 8:
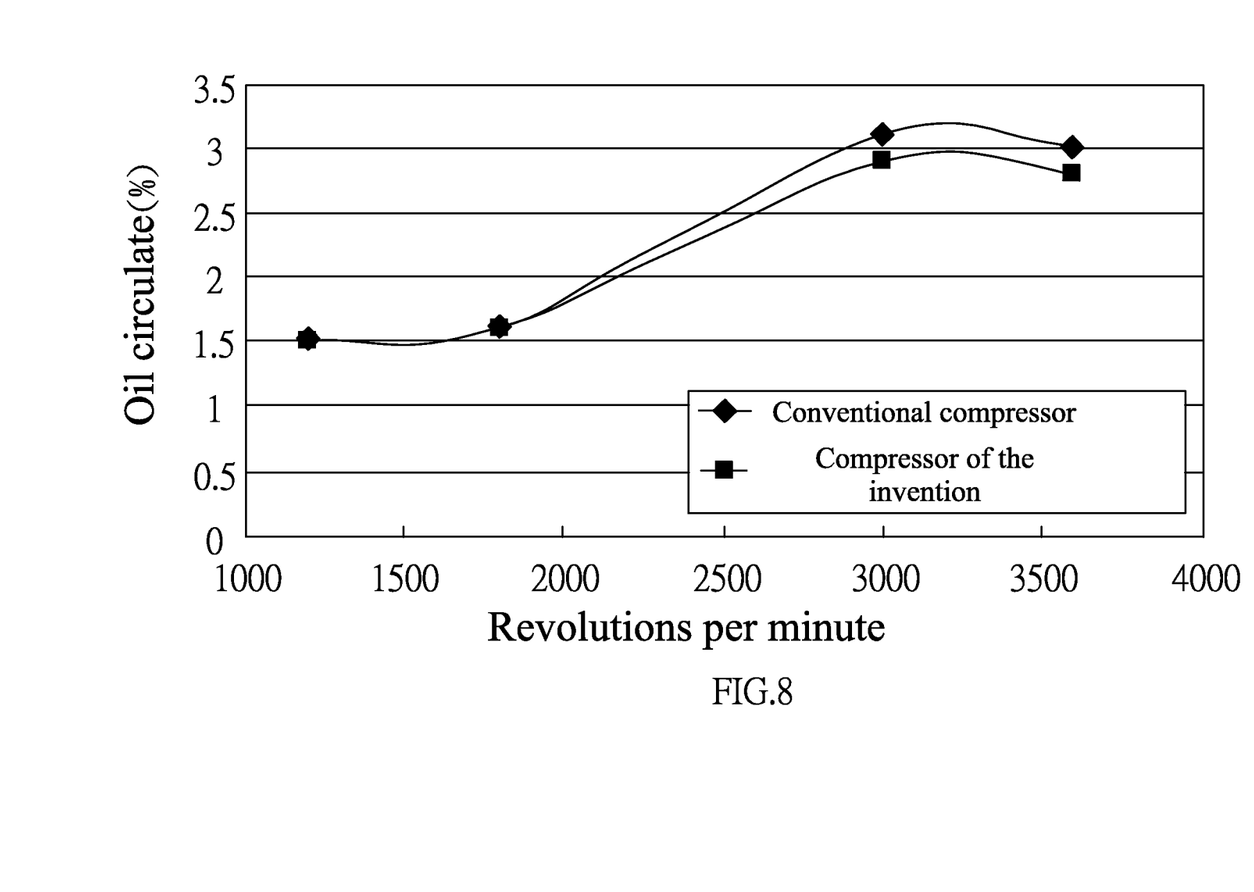
FIG. 8 is an illustration diagram of oil circle rate from the compressor of the invention and the conventional compressor.

As shown in FIG. 7 for an illustration diagram of noise generated from the compressor of the invention and conventional compressors is depicted. Under the same operational speed, noise generated by the operation of the compressor of the invention is relatively low. As shown in FIG. 8 for an illustration diagram of oil circle rate from the compressor of the invention and the conventional compressor is depicted. Under the same high operational speed, the oil circle rate of the operation of the compressor of the invention is relatively low.

In addition, each tooth 127 is formed with insulation members 128 vertically extended toward the intervals 125. The sealed cover portion 224 is formed with gaps 225 on the insulation members 128. While in convenient assembly, the insulation members 128 can be contained in a gas 225.

The invention improves over the prior art and complies with patent application requirements, and thus is duly filed for patent application. While specific embodiments have been described, numerous modifications and variations could be made thereto by those generally skilled in the art without departing from the scope and spirit of the invention set forth in the claims.

What is claimed is:

1. A compressor comprising:
   a sealed container;
   a power driven component disposed in the sealed container, the power driven component disposed with a stator circularly installed in a circular state along an inner surface of the sealed container and rotors inserted into inner sides of the stator, the rotors fastened with a rotary shaft extended toward a vertical direction, the stator having an iron core in a circular ring and a plurality of stator coils, the stator coils installed to a plurality of tooth portions at inner circumference of the iron core, inner side of the stator formed with intervals vertically passing through formed between adjacent stator coils; and
   a cover body disposed on the stator, the cover body disposed with a ring edge capable of being fastened to the stator, the ring edge formed with a shield member that is toward the stator coils, the shield member formed with upper portions along each stator coil and bending curve portions at two sides of the upper portions, the upper portions relatively located on the stator coils, and the upper portions disposed with at least one through hole, each bending curve portion extended toward the interval from the upper portion, each sealed cover portion connected between the bending curve portions of each upper portion, the sealed cover portion correspondingly sealing each interval.

2. The compressor as recited in claim 1, wherein at least one through hole is disposed on the bending curve portions.

3. The compressor as recited in claim 1, wherein an upper portion and a lower portion of the iron core are respectively disposed with an upper frame and a lower frame.

4. The compressor as recited in claim 3, wherein the ring edge is disposed with at least one fastening hole, and a side of the upper frame is formed with fastening blocks corresponding to each other; and the ring edge is disposed with at least one fastening block, and the side of the upper frame is formed with the fastening holes corresponding to each other.

5. The compressor as recited in claim 1, wherein an insulation member that is vertically extended toward the intervals is formed to each tooth portion, and the sealed cover portion is formed with gaps on the insulation member.

6. The compressor as recited in claim 1, wherein a rotary compression component driven by the rotary shaft of the power driven component is disposed below the inside of the sealed container.

* * * * *